(12) United States Patent
Royall

(10) Patent No.: US 6,523,206 B2
(45) Date of Patent: Feb. 25, 2003

(54) CUSTOM ORTHOTIC SANDAL AND PROCESS FOR CONSTRUCTING

(76) Inventor: Steven P. Royall, 1060 E. 100 South, #207, Salt Lake City, UT (US) 84102

( * ) Notice: Subject to any disclaimer, the term of this patent is extended or adjusted under 35 U.S.C. 154(b) by 0 days.

(21) Appl. No.: 09/828,380

(22) Filed: Apr. 6, 2001

(65) Prior Publication Data

US 2002/0144363 A1 Oct. 10, 2002

(51) Int. Cl.[7] ................. A43D 11/00; A43D 21/00; A43D 9/00
(52) U.S. Cl. ............... 12/142 N; 12/146 M; 36/11.5; 36/154
(58) Field of Search ............... 12/142 N, 146 M; 36/11.5, 154, 88, 93

(56) References Cited

U.S. PATENT DOCUMENTS

| | | | | |
|---|---|---|---|---|
| 2,688,760 A | * | 9/1954 | Forte | 12/146 M |
| 3,825,017 A | * | 7/1974 | Scrima | 36/181 |
| 4,155,180 A | * | 5/1979 | Phillips | 36/103 |
| 4,217,705 A | | 8/1980 | Donzis | |
| 4,503,576 A | | 3/1985 | Brown | |
| 4,747,989 A | * | 5/1988 | Peterson | 264/223 |
| 4,868,945 A | * | 9/1989 | DeBettignies | 12/142 N |
| 4,901,390 A | | 2/1990 | Daley | |
| 5,036,604 A | | 8/1991 | Rosen | |
| 5,154,173 A | * | 10/1992 | Aultman | 128/DIG. 21 |
| 5,285,584 A | | 2/1994 | Dubner | |
| 5,323,549 A | | 6/1994 | Segel et al. | |
| 5,327,664 A | * | 7/1994 | Rothbart | 36/174 |
| 5,555,584 A | | 9/1996 | Moore, III et al. | |
| 5,921,009 A | | 7/1999 | Hice | |
| 6,021,585 A | | 2/2000 | Cole | |
| 6,042,759 A | * | 3/2000 | Marshall | 36/93 |

* cited by examiner

Primary Examiner—Ted Kavanaugh
(74) Attorney, Agent, or Firm—Clayton, Howarth & Cannon, P.C.

(57) ABSTRACT

A custom orthotic sandal is formed to a biomechanically corrected shape of a user. To obtain the proper shape for the sandal, a negative cast is taken of the user's foot. A positive impression cast is then formed from the negative cast. The positive impression cast is then modified to correct for biomechanical abnormalities of the user's foot. The custom orthotic sandal is formed by adhering a moldable material on the sole of the sandal. The positive impression cast is then pressed on the moldable material to form the proper shape. The moldable material is then set and the sole is assembled into the sandal.

21 Claims, 4 Drawing Sheets

CUSTOM ORTHOTIC SANDAL AND PROCESS FOR CONSTRUCTING

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. The Field of the Invention

The present invention relates generally to footwear, and more particularly, but not necessarily entirely, to custom orthotic sandals and methods of making the same.

2. Description of Related Art

Human feet have nearly one hundred individual working parts including bones, ligaments, muscles, and tendons. To be pain free and efficient, these complex parts must exist in a specific relationship with one another. The perfect relationship of one foot structure to another may be damaged by fallen arches, loose muscles, biomechanical defects such as pronation (a rolling in of the foot), supination (a rolling out of the foot), heel spurs, bunions, or other defects. When this occurs, a person develops tired, aching feet and ankles, or pains in specific areas of the feet and ankles.

Orthotics are specialized mechanical devices used to support or supplement weakened or abnormal joints or limbs. Orthotics allow the feet and ankles to function without pain, and protect them from the repetitive stress of normal walking or sports activities. Orthotics relieve foot and ankle fatigue and pain by supporting and gently repositioning the individual components of the feet and stabilizing the ankles to allow the feet to function efficiently again.

Examples of orthotic footwear known in the art include U.S. Pat. No. 5,921,009 (granted Jul. 13, 1999 to Hice). This patent discloses a foot orthotic device having a plate and a fulcrum which can be placed in a shoe to provide the wearer with mechanical improvement of abnormal, functional and associated foot pathology. However, the orthotic device is for use with conventional shoes. Typically, orthotic devices are not suitable for use in sandals because the orthotic devices require a stable heel support to stay in contact with the foot during walking.

U.S. Pat. No. 5,555,584 (granted Sep. 17, 1996 to Moore, III et al.) discloses a custom orthotic sandal and a method for making the same. In this sandal an orthotic footbed is placed between a bottom sole and a lightweight top sole. The footbed is composed of a bag containing a gel formed of uncured silicone rubber, a cross-linking agent, a polymer and liquid plasticizer. A person puts the sandal on, and walks around on it. The gel in the footbed retains the impression of the foot. The sandal is then removed, heated to 130 degrees Fahrenheit, and allowed to cool. The gel in the footbed then becomes solid retaining the negative image of the foot. However, this invention does not allow for the adjustment of the impression in the footbed to correct abnormalities in the foot as part of a treatment program. In other words, the shape of the footbed corresponds to the shape of the user's foot, rather than a shape required to correct an irregularity with the user's foot. For example, if a person has flat feet, the impression of the flat feet is retained in the footbed rather than the enhanced shape required to treat flat feet. Also, the entire sandal must be heated to solidify the gel which may have detrimental effects on some of the materials in the sandals.

U.S. Pat. No. 4,503,576 (granted Mar. 12, 1985 to Brown) discloses a cork resin to form an orthotic device for use in shoes and boots. The orthotic device is heated to cause the cork to expand, a person then places a foot on the orthotic device and a plastic bag is sealed around the foot and the orthotic device. The air is then evacuated from the bag to cause the expanded cork resin to conform to the surfaces of the foot. This invention similarly does not allow for the adjustment of the orthotic device to correct abnormalities in the foot as part of a treatment program. Furthermore, the method of manufacturing this device is inconvenient since the user must be subjected to the vacuum bag procedure each time a new orthotic device is desired.

U.S. Pat. No. 4,901,390 (granted Feb. 20, 1990 to Daley) discloses a multilayer custom insole for use in ski boots and other shoes. This custom insole is composed of a polyethylene foam over a layer of extruded polyethylene. The custom insole is heated and placed into a molding platform. A person then steps into the platform and places downward force on the custom insole, which conforms to the foot of the person. The custom insole wraps around the heel and sides of the foot. The heel portion of the custom insole is then flattened and made flush with the portion corresponding to the ball of the foot. This invention suffers similar drawbacks as the preceding two inventions in that the custom insole is not modified to provide corrective characteristics, and a user must repeat the procedure of standing on a heated insole each time a new device is desired.

The prior art is thus characterized by several disadvantages that are addressed by the present invention. The present invention minimizes, and in some aspects eliminates, the above-mentioned failures, and other problems, by utilizing the methods and structural features described herein.

In view of the drawbacks inherent in the available art, it would be a significant advance in the art to provide an orthotic device which is simple in design and manufacture and capable of being used in a sandal. It would also be an advancement in the art to provide an orthotic device which is adapted for custom treatment or prevention of a foot ailment, and which can be duplicated without repeated fitting by the user.

BRIEF SUMMARY AND OBJECTS OF THE INVENTION

In view of the above described state of the art, the present invention seeks to realize the following objects and advantages.

It is an object of the present invention to provide an orthotic device which is simple in design and manufacture.

It is another object of the present invention to provide an orthotic device which can be used in a sandal.

It is a further object of the present invention to provide a method of manufacturing an orthotic device such that the orthotic device can be duplicated without repeated fitting by the user.

It is an additional object of the invention, in accordance with one aspect thereof, to provide an orthotic device which is adapted for treatment or prevention of a foot ailment.

The above objects and others not specifically recited are realized in a specific illustrative embodiment of a custom fitting orthotic sandal for use in treating or preventing ailments of a user's foot, and a method of forming the sandal. The sandal is made by first forming a negative cast of the user's foot. Then a positive impression cast in a shape of the user's foot is formed by filling the negative cast with a plaster of paris. The positive impression cast is modified to correct for biomechanical abnormalities of the user's foot. A moldable material is then adhered to a top surface of a sole of the sandal. Then the positive impression cast is pressed onto the moldable material to form the moldable material in a shape configured for treating or preventing ailments of the user's foot. The moldable material is then set and assembled into an upper of the sandal. Various types of footwear can be made in this manner.

Additional objects and advantages of the invention will be set forth in the description which follows, and in part will be apparent from the description, or may be learned by the practice of the invention without undue experimentation. The objects and advantages of the invention may be realized and obtained by means of the instruments and combinations particularly pointed out in the appended claims.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF THE PREFERRED EMBODIMENTS

Before the present apparatus and methods for manufacturing the custom orthotic device are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

Figure 1:
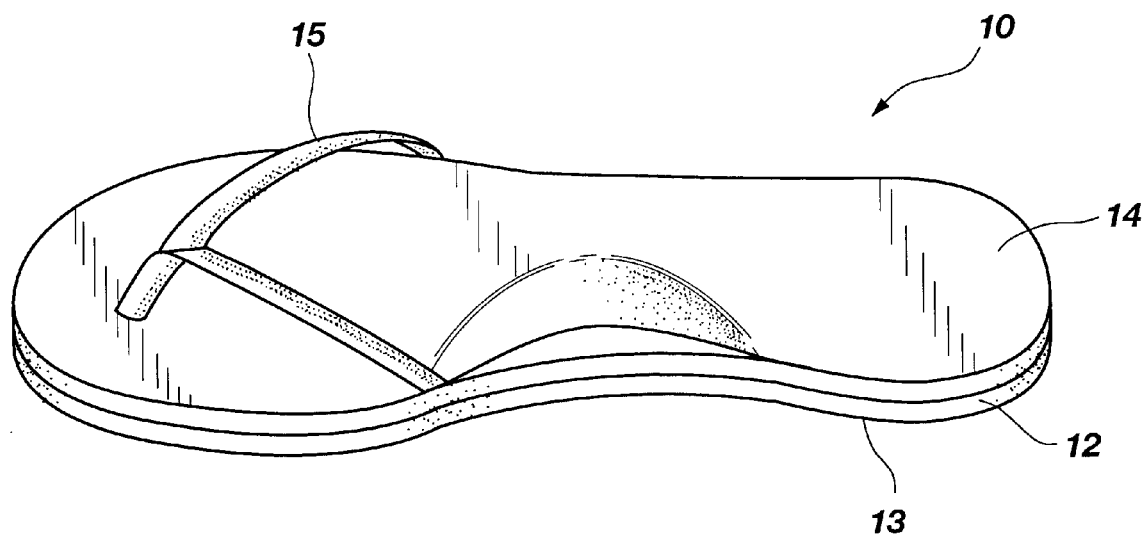
FIG. 1 is a perspective view of a sandal in accordance with the present invention.
Figure 2:
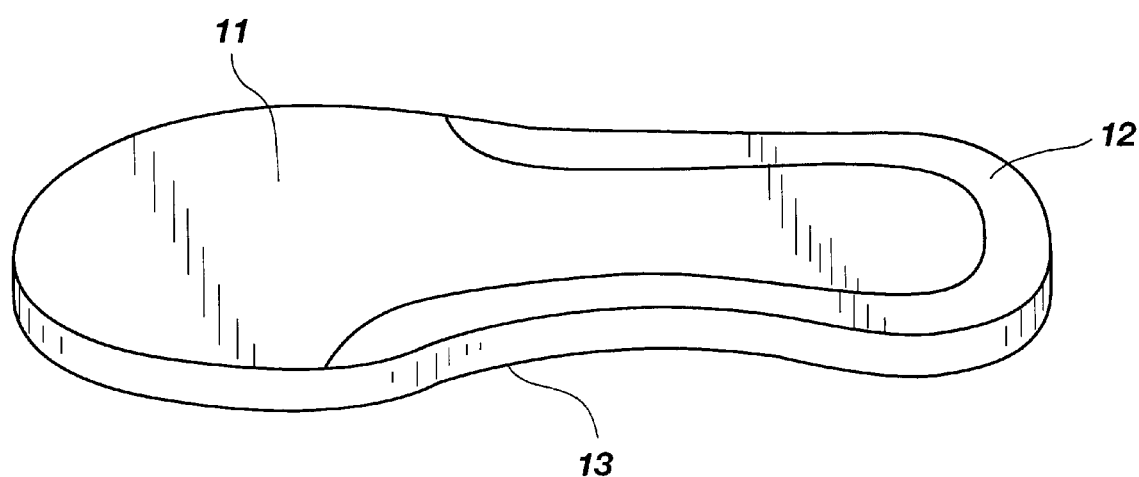
FIG. 2 is a perspective view of a sole for a sandal or other footwear.

Referring now to FIG. 1, footwear in the form of a sandal, generally indicated at 10, is shown in accordance with the present invention. It will be appreciated that although a sandal is shown, the present invention can be used in other types of footwear in various styles., Footwear as referred to herein includes any variety 'of attire for a person's feet including shoes, boots, slippers and sandals for example. Sandals are a specific variety of footwear which include a sole fastened to the foot by a variety of straps or thongs, providing protection for the bottom of the foot but not the entire top portion of the foot. The user's heel is often allowed to move relative to the sole in sandals. The sandal 10 includes a prefabricated industry standard high density rubber sole 12 as shown in FIG. 2. The sole 12 is the underside of the footwear having a top surface 11 and a bottom surface 13. The sandal 10 has an orthotic layer 14, and upper components 15 including any of a variety of, straps, thongs, buckles or uppers, defined as the portion of the footwear above the sole. It will be appreciated to those skilled in the art that many different types of soles and uppers can be used within the scope of the present invention.

The orthotic layer 14 is custom fit to a particular user to correct abnormalities of the foot as part of a treatment program. For example, the shape of the orthotic layer 14 is specifically configured to correct irregularities such as fallen arches, loose muscles, heel spurs, bunions, or biomechanical defects such as pronation or supination, or other defects. Thus, the shape of the orthotic layer 14 does not merely conform to the foot of a user, but rather forces the foot of the user into a position to treat or prevent a particular ailment.

Figure 3:
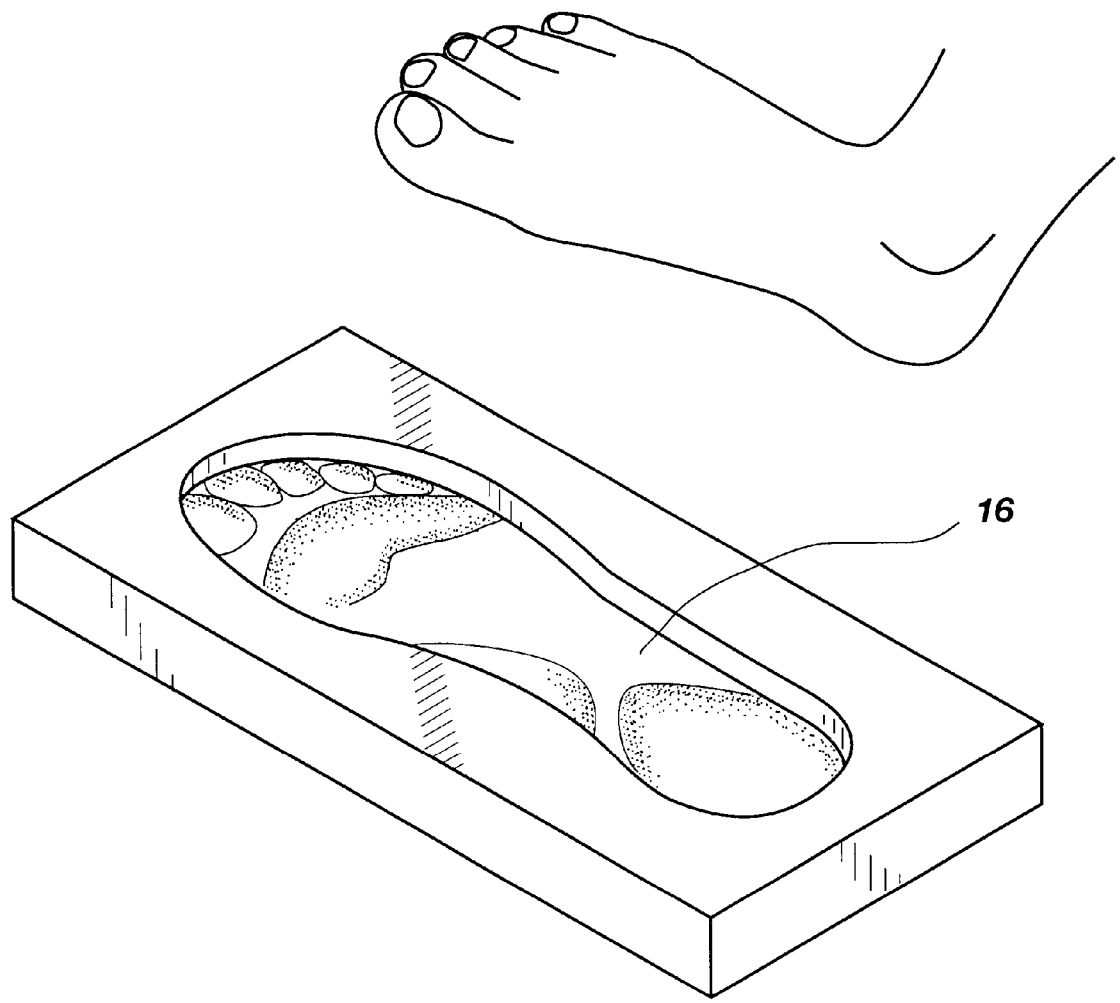
FIG. 3 is a perspective view of a negative cast of a person's foot.
Figure 4:
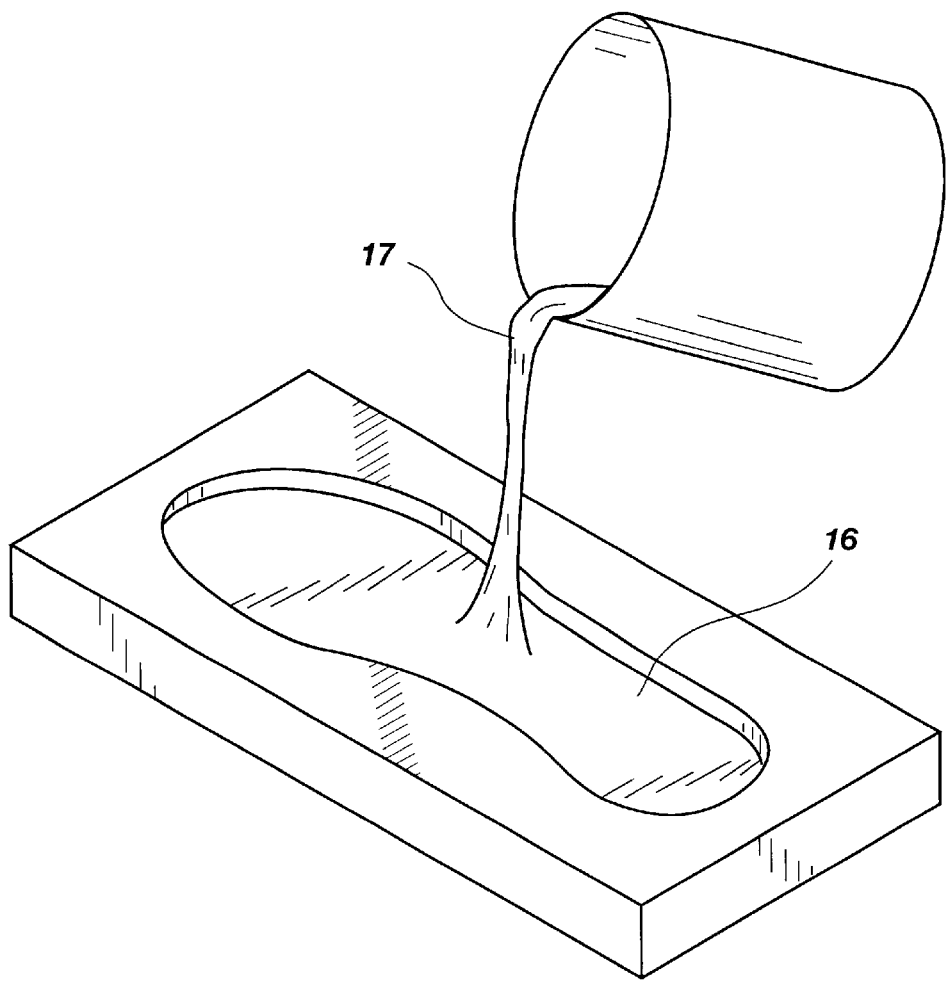
FIG. 4 is a perspective view depicting the step of filling the negative cast with a casting material.
Figure 5:
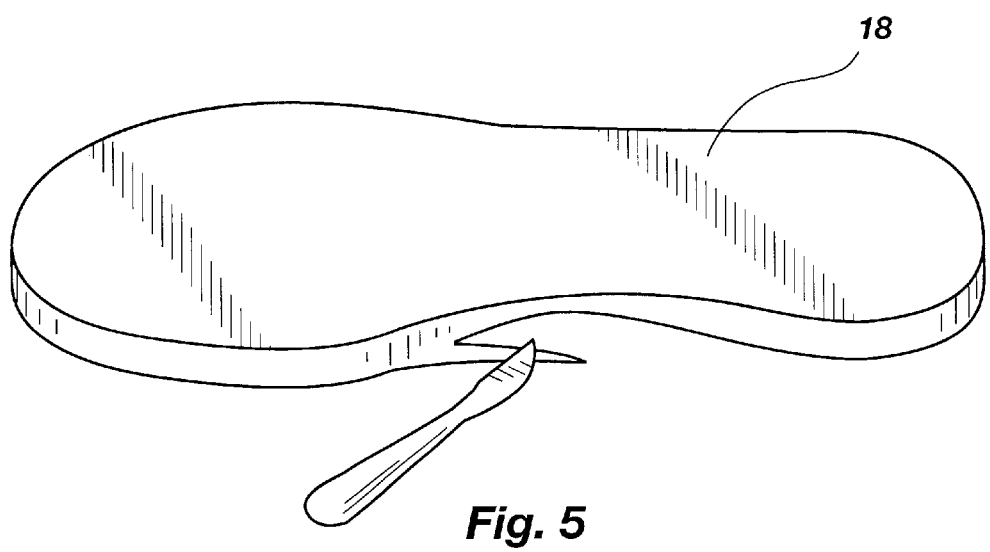
FIG. 5 is a perspective view of a biomechanically corrected, positive impression cast of a person's foot.

The process of making the sandal 10 will now be described. First, as shown in FIG. 3, a negative cast 16 of a person's foot is taken in a subtalar joint neutral position. The neutral position of the subtalar joint is the point where the foot is neither supinated or pronated. Once the negative cast 16 is obtained, it is then converted into a positive impression cast 18, as shown in FIG. 4, by filling the negative cast 16 with a casting material 17 such as plaster of paris or any other suitable material for making a cast known in the art. As shown in FIG. 5, the positive impression cast 18 is then modified by changing the shape to correct for any biomechanical abnormalities that the referring physician wants to treat. This may involve removing material from specific areas of the positive impression cast with an instrument such as a knife or a file, or adding material to specific areas of the positive impression cast such that the resulting positive impression cast is configured in the desired shape of the user's treated foot. Alternatively, an existing positive impression cast that has been modified by an independent orthotics laboratory or other source may be utilized'so long as a suitable shaped impression can be created for treating or preventing ailments of a user's foot.

Figure 6:
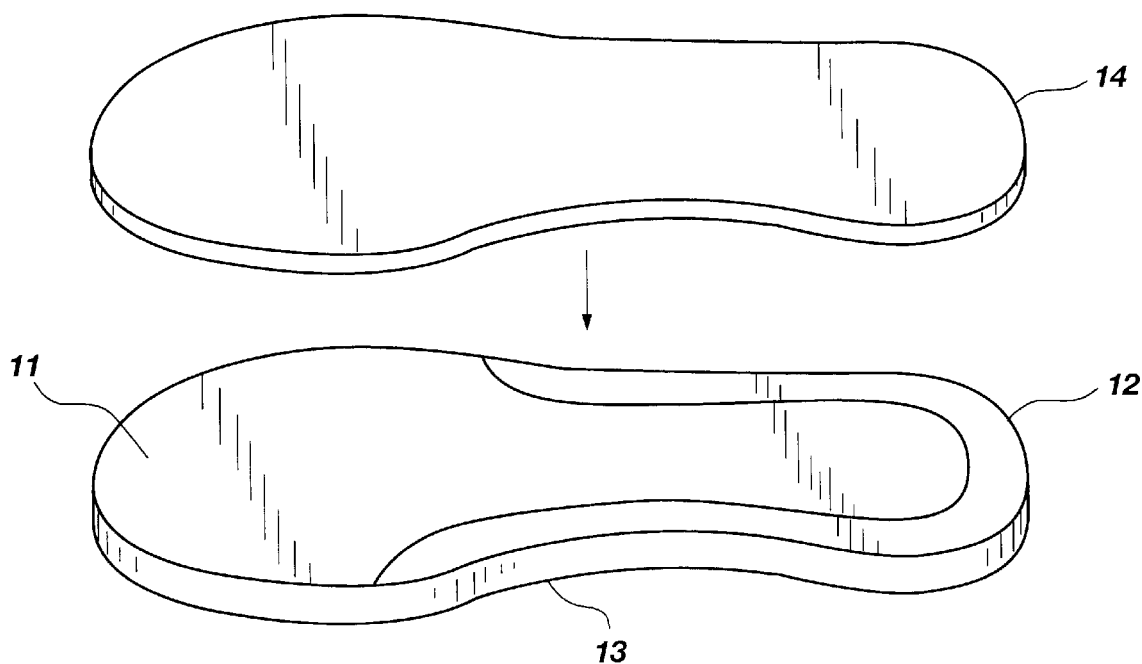
FIG. 6. is a perspective view of a moldable material being adhered to the surface of the sole of FIG. 2.
Figure 7:
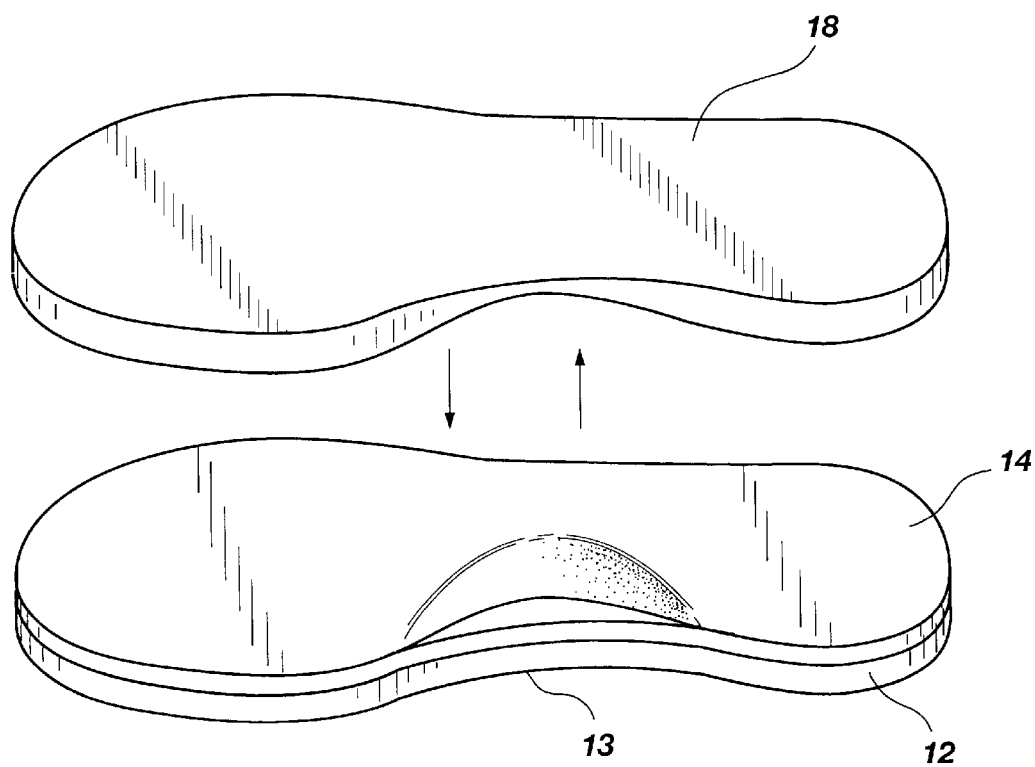
FIG. 7 is a perspective view of a positive impression cast pressing a shape on the moldable material.

Next, a thermo-moldable material such as polypropylene cork, leather, or thermosky is precut to a desired size and heated to a moldable condition. The thermo-moldable material is then adhered by glue or other suitable method to the top surface 11 of the high density sole 12 as shown in FIG. 6. Before the thermo-moldable material is allowed to cool, the positive impression cast 18 is pressed into the thermo-moldable material as shown in FIG. 7 to form the orthotic layer 14 of the desired shape. Various methods of pressing, such as vacuum or hydraulic pressing can be used to press the positive impression cast 18 into the thermo-moldable material. Although a thermo-moldable material is the preferred material, it will be appreciated-to those skilled in the art that many different types of moldable materials can be used within the scope of the present invention.

Adhering the orthotic layer 14 directly on the top surface of the sole 12 allows the orthotic layer 14 to function in a variety of footwear and is particularly beneficial for sandals since no support from the upper components 15 is necessary to maintain the orthotic layer 14 in proper position. The support required for the orthotic layer 14 is provided through the top surface 11 of the sole 12. Also, the orthotic layer 14 is fixed to the footwear as a single piece so that adjustments are not necessary, and the loss of pieces of the orthotic is prevented.

Since the shape of the orthotic layer 14 is created by a positive impression cast 18, the positive impression cast 18 can be altered to create an orthotic layer 14 that can be custom fitted to treat or prevent a specific foot ailment. This is an improvement over orthotics which are formed directly from a user's foot because when the user's foot is pressed on the moldable material, flaws in the shape of the user's foot are transposed onto the orthotic layer. Also, since a positive impression cast is made, duplicate orthotics can be made without the need for repeated fitting by the user.

In a preferred embodiment, the thermo-moldable material is ⅜ inch polypropylene available from JMS Plastics Supply, Inc. of Neptune, N.J., as well as other suppliers known to those skilled in the art. Polypropylene maintains a fixed shape at usual ambient temperatures, but when heated is capable of being molded. In the preferred embodiment, the polypropylene is heated to 350–400 degrees Fahrenheit for less than four minutes. However, it will be understood that other thermo-moldable materials, heating temperatures, and heating times can be used within the scope of the present invention.

The shape of the orthotic layer 14 is set by simply allowing the thermo-moldable material to cool. Once the newly created orthotic cools, it is sanded to remove all ridges, grooves or irregularities. Care must be taken at this step not to change the biomechanical corrections made to the orthotic layer. At this point, the upper components 15 of the sandal may be added to complete the footwear. Additional sandals can also be made using the same positive impression cast without the need for the user to repeat the fitting procedures.

In view of the foregoing, it will be appreciated that the present invention provides an orthotic device which is simple in design and manufacture and capable of being used in a sandal. The present invention also provides an orthotic device which is adapted for custom treatment or prevention of a foot ailment, and which can be duplicated without repeated fitting by the user.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of forming custom fitting orthotic footwear for use in treating or preventing ailments of a user's foot, said method comprising the steps of:
   (A) forming a positive impression cast in a shape of the user's foot with alterations to correct for biomechanical abnormalities of the user's foot;
   (B) adhering a moldable material to a top surface of a sole of the footwear; and
   (C) pressing the positive impression cast onto the moldable material against the sole to form the orthotic device in a shape configured for treating or preventing ailments of the user's foot.

2. The method of claim 1 wherein the footwear is a sandal.
3. The method of claim 1 wherein step (A) comprises the step of forming a negative cast of the user's foot.
4. The method of claim 3 wherein the positive impression cast is formed by filling the negative cast with plaster of Paris.
5. The method of claim 1 wherein the moldable material is thermo-moldable.
6. The method of claim 1 wherein the moldable material is polypropylene.
7. The method of claim 1 wherein step (C) comprises the step of hydraulically pressing the positive impression cast onto the moldable material.
8. The method of claim 1 wherein step (C) comprises the step of vacuum pressing the positive impression cast onto the moldable material.
9. The method of claim 1 further comprising the step of setting the moldable material.
10. The method of claim 1 wherein the moldable material is set by cooling.
11. The method of claim 1 wherein the sole is made of a high density rubber.
12. The method of claim 1 further comprising the step of assembling the sole into the footwear.
13. The method of claim 1 wherein step (B) comprises adhering a moldable material consisting of a single layer to the sole of the footwear.
14. A method of forming a custom fitting orthotic sandal for use in treating or preventing ailments of a user's foot, said method comprising the steps of:
   (A) forming a negative cast of the user's foot in a subtalar joint neutral position;
   (B) forming a positive impression cast in a shape of the user's foot by filling the negative cast with plaster of Paris;
   (C) modifying the positive impression cast by at least one of the group consisting of (i) removing material from specific areas of the positive impression cast and (ii) adding material to specific areas of the positive impression cast, such that the positive impression cast is configured in the shape of the user's foot in a treated condition;
   (D) providing a rubber sole configured to form an underside of the sandal, said rubber sole having a top surface and a bottom surface;
   (E) providing a layer of thermo-moldable polypropylene material, said layer of thermo-moldable polypropylene material consisting of a single layer having an upper surface and a lower surface;
   (F) adhering said lower surface of said layer of thermo-moldable polypropylene material to said top surface of said rubber sole;
   (G) heating the layer of thermo-moldable polypropylene material to a temperature in the range of 350–400 degrees Fahrenheit for less than four minutes;
   (H) pressing the positive impression cast onto the upper surface of the layer of thermo-moldable polypropylene material against said rubber sole to form the layer of thermo-moldable polypropylene material in a shape configured for treating or preventing ailments of the user's foot;
   (I) setting the layer of thermo-moldable polypropylene material by allowing the layer of thermo-moldable polypropylene material to cool;
   (J) sanding the layer of thermo-moldable polypropylene material to remove surface irregularities; and (K) assembling the layer of thermo-moldable polypropylene material and sole into an upper of the sandal, said upper being configured to allow movement of the user's heel without constraint.

15. A method of forming a custom fitting orthotic sandal for use in treating or preventing ailments of a user's foot, said method comprising the steps of:

(A) forming a negative cast of the user's foot;

(B) forming a positive impression cast in a shape of the user's foot by filling the negative cast with a casting material;

(C) modifying the positive impression cast to correct for biomechanical abnormalities of the user's foot;

(D) adhering a moldable material to a top surface of a sole of the sandal, said moldable material consisting of a single layer;

(E) pressing the positive impression cast onto the moldable material against said sole to form the moldable material in a shape configured for treating or preventing ailments of the user's foot;

(F) setting the moldable material; and (G) assembling the sole into an upper of the sandal.

16. The method of claim 15 wherein the moldable material is thermo-moldable.

17. The method of claim 15 wherein the moldable material is polypropylene.

18. The method of claim 15 wherein step (E) comprises the step of hydraulically pressing the positive impression cast onto the moldable material.

19. The method of claim 15 wherein step (E) comprises the step of vacuum pressing the positive impression cast onto the moldable material.

20. The method of claim 15 wherein the moldable material is set by cooling.

21. The method of claim 15 wherein the sole is made of a high density rubber.

* * * * *